(12) United States Patent
Benner et al.

(10) Patent No.: US 9,274,299 B2
(45) Date of Patent: Mar. 1, 2016

(54) MODULAR OPTICAL BACKPLANE AND ENCLOSURE

(75) Inventors: Alan F. Benner, Poughkeepsie, NY (US); David Graybill, Staatsburg, NY (US); Edward Seminaro, Milton, NY (US); Richard Rieland, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 13/597,530

(22) Filed: Aug. 29, 2012

(65) Prior Publication Data

US 2015/0301299 A1 Oct. 22, 2015

(51) Int. Cl.
 G02B 6/38 (2006.01)
 G02B 6/44 (2006.01)
 G02B 6/43 (2006.01)

(52) U.S. Cl.
 CPC ............ G02B 6/4452 (2013.01); G02B 6/3897 (2013.01); G02B 6/43 (2013.01)

(58) Field of Classification Search
 CPC . G06F 9/30036; G06F 9/3885; G06F 9/3836; G06F 15/8076; G06F 15/8053; G02B 6/4452; G02B 6/3897; G02B 6/43
 See application file for complete search history.

(56) References Cited

U.S. PATENT DOCUMENTS

| | | | |
|---|---|---|---|
| 5,513,293 A * | 4/1996 | Holland et al. | 385/134 |
| 5,980,312 A | 11/1999 | Chapman et al. | |
| 6,456,620 B1 | 9/2002 | Wang et al. | |
| 6,801,693 B1 | 10/2004 | Jacobowitz et al. | |
| 7,142,746 B2 | 11/2006 | Look | |
| 7,505,822 B2 | 3/2009 | Vishkin | |
| 7,587,115 B1 | 9/2009 | Thorson et al. | |
| 7,597,483 B2 | 10/2009 | Simmons et al. | |
| 7,738,748 B2 | 6/2010 | Strasser et al. | |
| 7,970,279 B2 | 6/2011 | Dress | |
| 8,065,433 B2 | 11/2011 | Guo et al. | |
| 2002/0093950 A1 | 7/2002 | Li | |
| 2008/0008472 A1 | 1/2008 | Dress et al. | |
| 2008/0257580 A1 | 10/2008 | Ishimoto | |
| 2008/0293307 A1* | 11/2008 | Wallace et al. | 439/723 |
| 2009/0310914 A1* | 12/2009 | Sasaki et al. | 385/32 |
| 2010/0329621 A1* | 12/2010 | Makrides-Saravanos et al. | 385/135 |
| 2011/0286691 A1 | 11/2011 | Hopkins et al. | |
| 2012/0144064 A1 | 6/2012 | Parker et al. | |
| 2012/0144065 A1 | 6/2012 | Parker et al. | |
| 2013/0322838 A1* | 12/2013 | Julien et al. | 385/135 |

FOREIGN PATENT DOCUMENTS

WO WO 9104232 A1 * 4/1991
WO 2012018618 A1 2/2012

* cited by examiner

*Primary Examiner* — Farley Abad
(74) *Attorney, Agent, or Firm* — Cantor Colburn LLP; Steven Chiu (57) ABSTRACT

Embodiments are directed to decomposing an all-to-all interconnection network topology into a plurality of smaller all-to-all interconnection network elements, replicating the interconnection network elements in a modular fashion, wherein the modular interconnection network elements construct the all-to-all interconnection network topology. Embodiments are directed to an apparatus comprising a shuffle cable assembly comprising a plurality of shuffle cables, where each of the plurality of shuffle cables comprises a plurality of optical fibers and a plurality of connectors, a block configured to organize, align, and maintain a position of the plurality of connectors, and at least one handle coupled to the block and configured to actuate the plurality of connectors.

5 Claims, 11 Drawing Sheets

MODULAR OPTICAL BACKPLANE AND ENCLOSURE

STATEMENT REGARDING FEDERALLY SPONSORED RESEARCH OR DEVELOPMENT

This invention was made with Government support under Contract Number HR0011-07-9-0002 awarded by DARPA (Defense Advanced Research Projects Agency). The Government has certain rights to this invention.

BACKGROUND

One issue in the design of any high-performance computing or networking gear is the issue of interconnection between printed circuit boards (PCBs), i.e., from one PCB to another PCB. Within a PCB, electronic processing circuitry can be interconnected using wiring layers within the printed circuit board. This type of interconnect can provide high performance and density—supporting up to thousands of interconnection wires, operating at rates potentially greater than 1-10 Gbps. However, interconnections between PCBs are more difficult, requiring either backplane-style boards that the interconnecting circuit boards plug into using backplane connectors, or cables. This results in the use of cable connectors (or backplane-style connectors) and bulk cable with wires or flex circuitry. As processing circuitry has steadily improved in performance and density, these board-to-board interconnection methods have become an increasingly-large bottleneck in design, since the density and bandwidth performance of cable connectors and electrical backplane connectors has not increased at the same rate as the processing circuitry.

BRIEF SUMMARY

An embodiment is directed to a method comprising decomposing an all-to-all interconnection network topology into a plurality of smaller all-to-all interconnection network elements, replicating the interconnection network elements in a modular fashion, wherein the modular interconnection network elements construct the all-to-all interconnection network topology. An embodiment is directed to an apparatus comprising a shuffle cable assembly comprising a plurality of shuffle cables, where each of the plurality of shuffle cables comprises a plurality of optical fibers and a plurality of connectors, a block configured to organize, align, and maintain a position of the plurality of connectors, and at least one handle coupled to the block and configured to actuate the plurality of connectors. An embodiment is directed to a system for decomposing an all-to-all interconnection network topology into a plurality of smaller all-to-all interconnection network elements, comprising a server computer comprising a plurality of drawers, a shuffle cable assembly comprising a plurality of shuffle cables, where each of the plurality of shuffle cables comprises a plurality of optical fibers and a plurality of connectors, a block configured to organize, align, and maintain the plurality of connectors, and at least one handle coupled to the block and configured to actuate the plurality of connectors with respect to the plurality of drawers.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the disclosure may be used in connection with interconnection networks for computers, switches and other information technology equipment, such as high-density networks for large clustered systems, high-performance computing and supercomputing systems, and cloud computing systems, for example. Embodiments of the disclosure may be applied in the area of electrical backplanes or optical backplanes, arrays of cables, connector arrays, and cable harnesses that interconnect, e.g., dozens or hundreds of switching elements, also termed switches or switch ICs or switch chips.

Embodiments of the disclosure may be used in connection with so-called "all-to-all" or "full mesh" networks, in one or more levels, where a multiplicity of switching elements (on the order of 16 to 64 or 128 switching elements in some embodiments) each have links to most or all of the other switching elements. Such networks, with ports interconnecting each switching element or with a large number of other switching elements (i.e., "high-radix" switching elements) are only recently technically feasible and cost-effective. Previously, integrated circuit switching chips could only be cost-effectively constructed using commonly-available CMOS integrated circuit technology, with a moderate number (e.g., 8-24) of ports. Such "all-to-all" or "full mesh" networks may be used to avoid or mitigate against deficiencies, such as congestion and extra latency that may be inherent in Multi-stage Interconnection networks using other topologies, such as Torus (in 2, 3, 4, 5, 6, or more dimensions), or Omega (also called "Butterfly" or "Clos", or "Fat Tree") topologies, where traffic must traverse several intermediate switching elements to traverse the network.

While all-to-all or full-mesh networks may have advantages over other network topologies in terms of performance, routing simplicity, and robustness against link failures, they might have several disadvantages or deficiencies. Such deficiencies may include one or more of: (a) each switching element must support a large number of ports, which must be tightly-packed, requiring high-density connector packing, (b) the network requires a large number (on the order of $n^2$) of interconnecting cables, and (c) the interconnecting cables form a complex topology, since the links connecting to each of the switching elements are "shuffled" and distributed across all of the other switching elements.

In order to address or alleviate one or more of the aforementioned deficiencies, embodiments of the disclosure may be used to simplify the construction and manufacturing of such all-to-all interconnection networks. In some embodiments, a generic decomposition of a single all-to-all interconnection network topology into a multiplicity of smaller all-to-all interconnection network elements may be provided, which can be replicated in a modular fashion, to construct the full topology. In this manner, an all-to-all topology may be broken down into units that can be replicated, where each unit may be larger or include more connections than a base-unit of a wire.

In the specific illustrative instance of optical networks with even numbers of drawers or books or blades, each containing a multiple of four (4) switching elements, use of multiple "shuffle cables" may be provided, where each shuffle cable may implement a 4×4 all-to-all topology, with a link width of one (1) or more fibers per link direction. Illustrative embodiments described herein show a topology with four (4) drawers, where each drawer contains eight (8) switching elements, and each link encompasses (6+6) fibers (i.e., six (6) fibers in each of the two directions), which implies that the entire structure may incorporate a modular aggregation of twenty-four (24) shuffle cables, with each shuffle cable implementing a 4×4×(6+6) all-to-all topology, incorporating one-hundred ninety-two (192) separate optical fibers or waveguides channels. Since each of the twenty-four (24) shuffle cables incorporates four (4) connectors on each of the two (2) ends, this complete optical backplane assembly may incorporate a total of one-hundred ninety-two (192) connectors, each of which may be a 48-fiber connector, using a standard "MT" or "MPO" Multi-fiber Push On/Pull Off optical connector design.

Embodiments of the disclosure may be used to enclose all (e.g., 4,608) fibers in 192 connectors and 24 "shuffle cartridges" in a high-density aggregation of approximately 4"×16"×8". An enclosure may incorporate both rigid and flexible components, providing: (a) close mechanical tolerances for connector plugging within each of the drawers (i.e., to approximately +/−0.1 millimeters in each of the 3 dimensions), while simultaneously maintaining looser mechanical tolerances (i.e., to approximately +/−5 millimeters) among the drawers, (b) robust protection of delicate optical fibers within a rigid shell, casing, or enclosure, and (c) incorporation of "gang-plug" handles that each actuate a multiplicity of the MPO.

Embodiments of the disclosure may include one or more so-called "shuffle cables." A shuffle cable may be configured to convey multiple arrays of signals from multiple multi-fiber optical connectors associated with a first printed circuit board (PCB) to multiple multi-fiber optical connectors associated with a second or another PCB.

Figure 1:
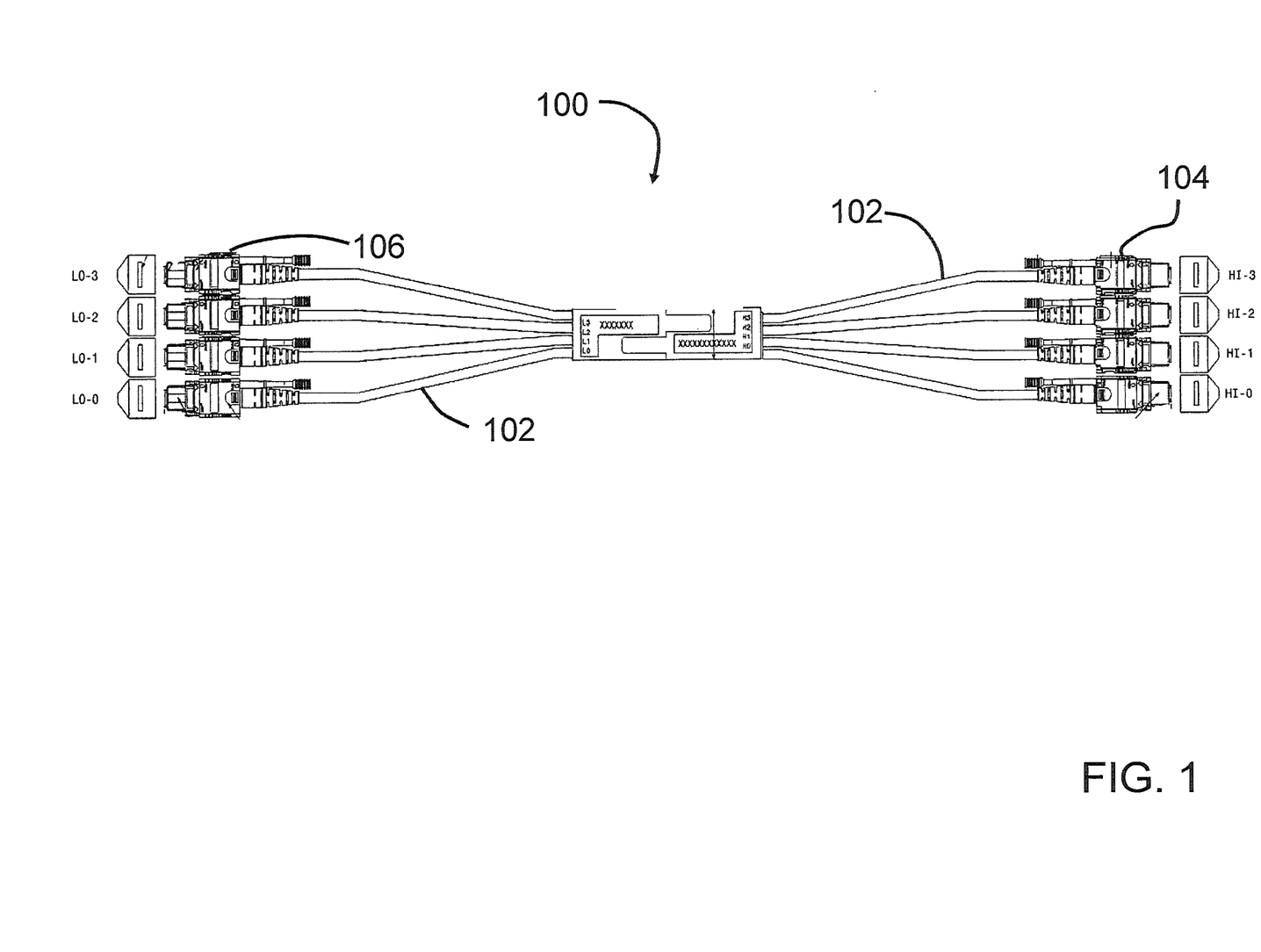
FIG. 1 depicts an exemplary shuffle cable in accordance with one or more embodiments.

An illustrative shuffle cable 100 is shown in FIG. 1. The shuffle cable 100 may contain a number of optical fibers. For example, in some embodiments the shuffle cable 100 may include one-hundred ninety-two (192) optical fibers.

The one-hundred ninety-two (192) optical fibers may be routed from, e.g., four (4) 48-fiber MPO-style multi-fiber optical connectors 104, to four (4) other of the 48-fiber MPO-style multi-fiber optical connectors 106. In an example embodiment, the routing may implement a "4×4×(6+6)" shuffle. In other words, four (4) groups 102 of twelve (12) fibers (e.g., six fibers for transmission of signals in one direction, and six fibers for transmission of signals in the other direction) may be shuffled from each of the "HI" connectors and distributed among the four (4) "LO" connectors. Thus, in some embodiments, fibers from a given connector (e.g., HI-0) may be routed or shuffled to one or more other connectors (e.g., one or more of LO-0, LO-1, LO-2, and LO-3). The lengths of the "arms" for each of the connectors may be sized to fit into an optical backplane, potentially without excess slack. In an example embodiment, twenty-four (24) of the shuffle cables 100 may be used to implement a shuffle from each of thirty-two (32) nodes to each of twenty-four (24) nodes in other drawers.

Figure 2:
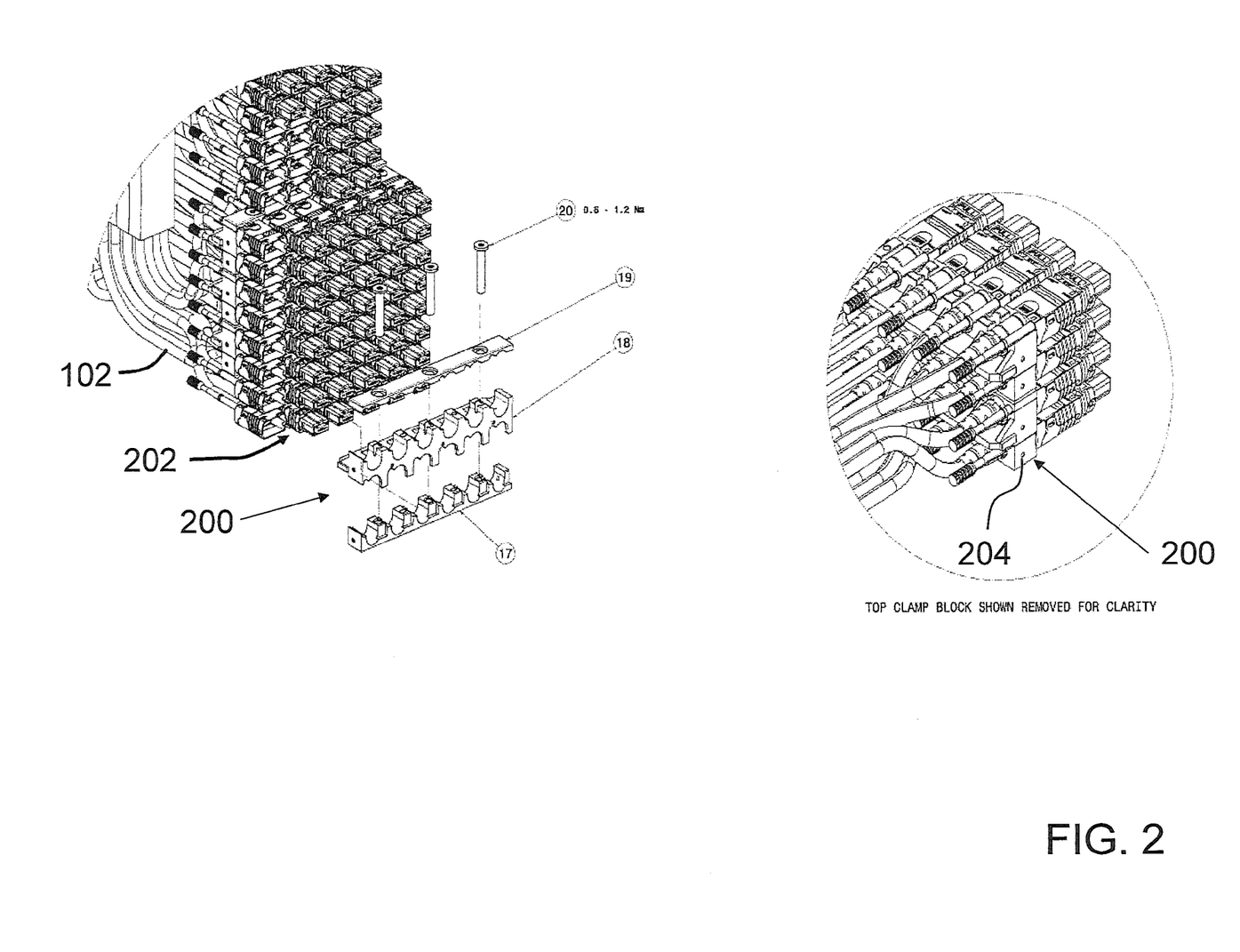
FIG. 2 depicts an exemplary block for supporting connectors in accordance with one or more embodiments.

FIG. 2 illustrates two different views of an exemplary block 200. The block 200 may be used to organize, align, and maintain an assembly of connectors 202, such as connectors 104, 106 associated with one or more shuffle cables 100. As shown in FIG. 2, the block 200 may include a bottom or first piece 17, a middle or second piece 18, and a top or third piece 19. The block 200 (e.g., pieces 17, 18, and 19) may be held together by one or more fasteners, such as screws 20. In one embodiment, the pieces 17, 18, 19 may include features that allow pieces 17, 18, 19 to be secured by a snap fit. The pieces 17, 18, and 19 may include grooves to facilitate seating and securing the connectors.

Figure 3:
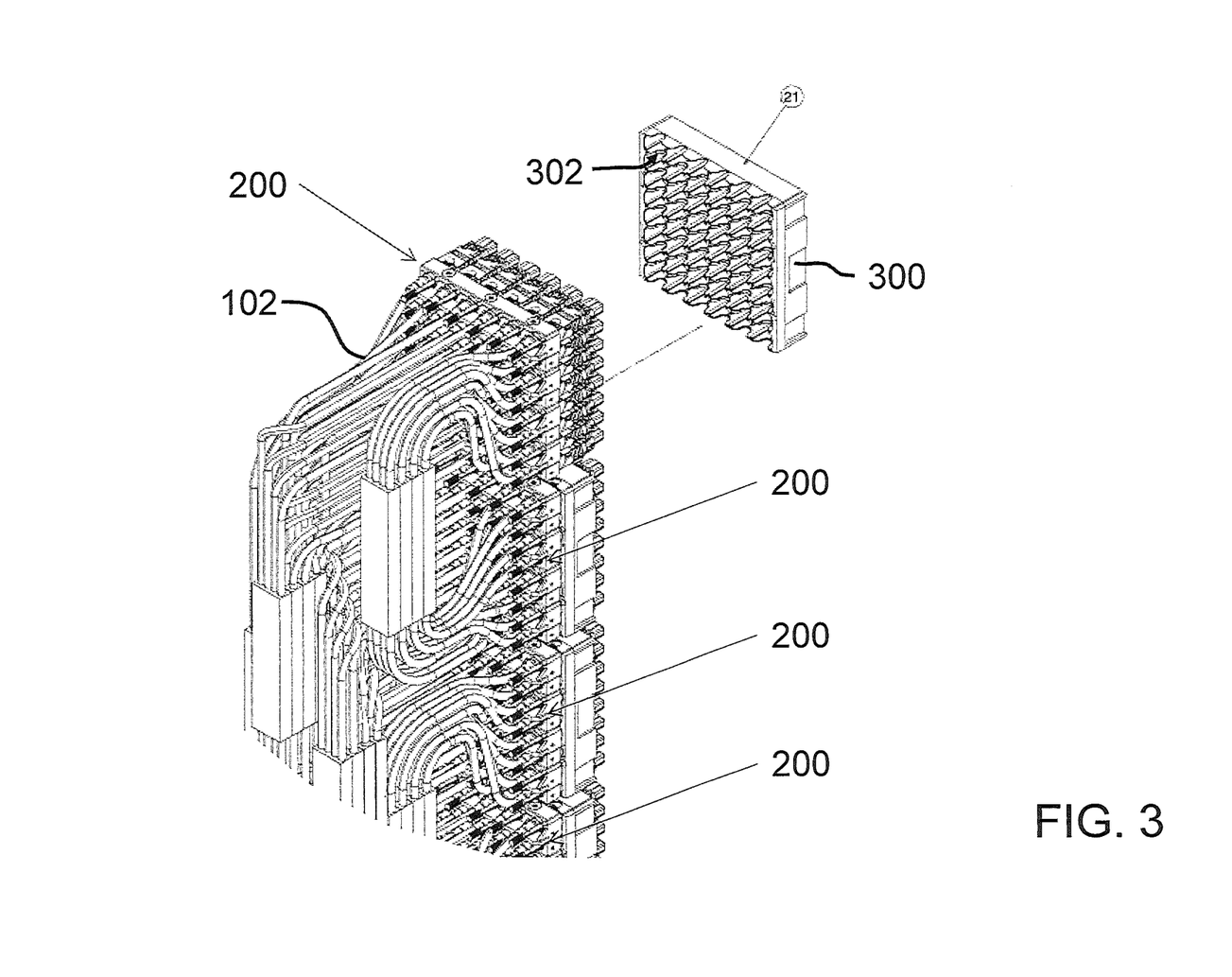
FIG. 3 depicts an exemplary node connector in accordance with one or more embodiments.

To further support an organization of connectors/shuffle cables 100, a node connector 21 may be used as shown in FIG. 3. The node connector 21 may be used to maintain an orientation of, or spacing between, the connectors as they plug into or mate with a platform or device (e.g., a server or a drawer of the server). While a single node connector 21 is shown in FIG. 3, more than one node connector 21 may be used in some embodiments. For example, a node connector 21 may mate with, or couple to, each of the blocks 200 shown in FIG. 3. In some embodiments, a node connector 21 may be sized so as to mate with, or couple to, a plurality of blocks 200. In the exemplary embodiment, the node connector 21 has a rectangular housing 300 having four enclosed sides that contain an array of connectors in a block 200. Each of the connectors is secured within a space that is defined by a plurality of divider walls 302. The divider walls 302 maintain the connectors of block 200 at the desired alignment, spacing, orientation and position.

Figure 4:
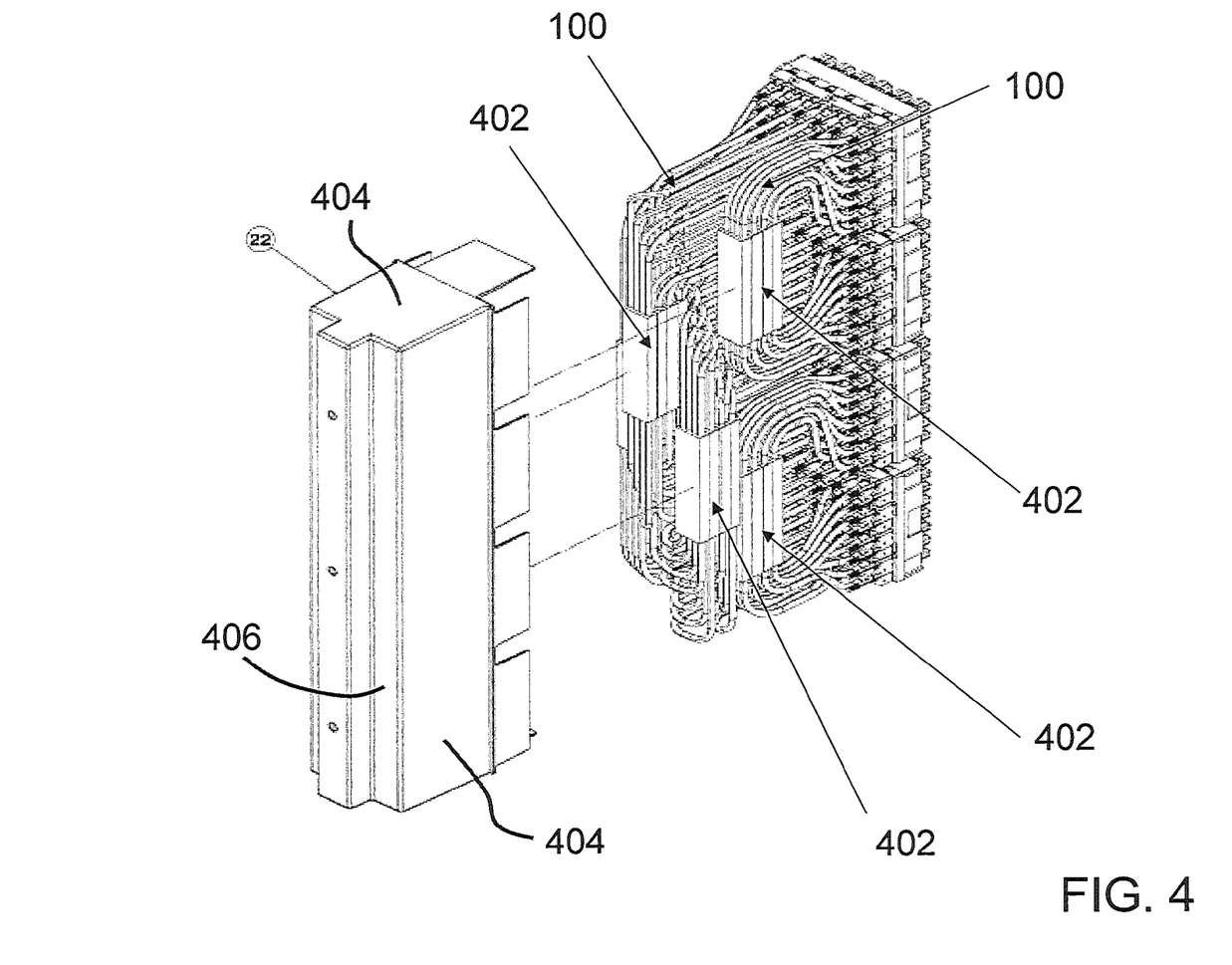
FIG. 4 depicts exemplary harnesses and an exemplary casing in accordance with one or more embodiments.

As shown in FIG. 4, one or more cables (e.g., shuffle cables 100) may be supported by one or more harnesses 402. The harnesses 402 may be of different sizes or dimensions to accommodate cables of different sizes (e.g., lengths). The cables 100 may be enclosed or protected by an enclosure 22. The enclosure 22 has four side walls 404 and an end wall 406 that define a hollow interior portion that is sized to fit over the cables 100. The enclosure 22 may help to ensure that the cables 100 do not break by providing a rigid outer covering of the cables 100. The enclosure 22 may be made of one or more materials, such as a metal, plastic, etc.

Figure 5:
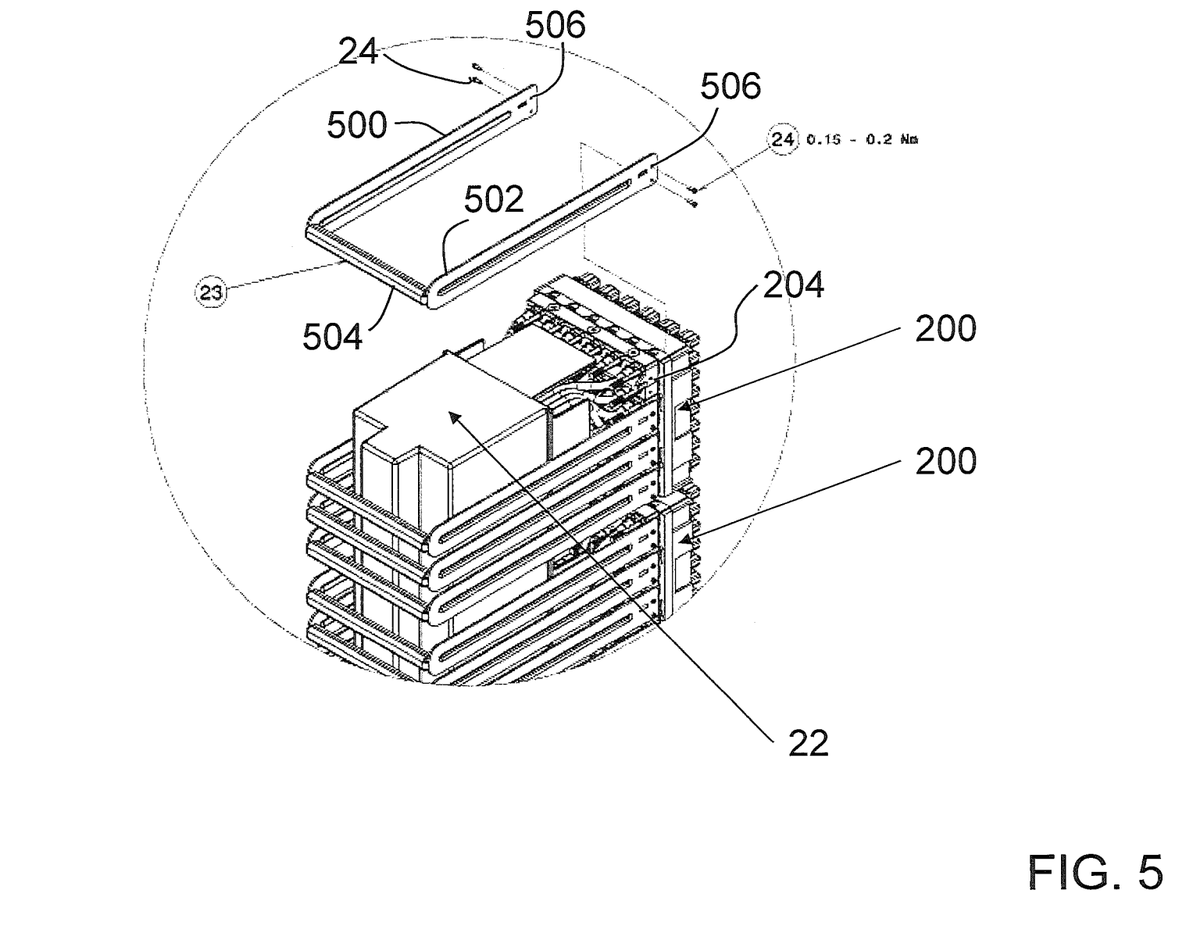
FIG. 5 depicts exemplary handle in accordance with one or more embodiments.

FIG. 5 illustrates a placement of one or more handles 23 around the exterior of the enclosure 22. Each handle 23 has a first leg 500 and a second leg 502 coupled together by a member 504. Each handle 23 may mate with, or couple to, a block 200, potentially via one or more fasteners, such as screws 24 for example, that extend through openings 506 located on the ends of legs 500, 502. The fasteners 24 engage corresponding openings in frame members 204 of block 200. The handles 23 may be used as an actuation mechanism to plug-in or unplug a plurality of connectors at once, thereby alleviating a need to plug-in or unplug each connector individually.

Figure 6:
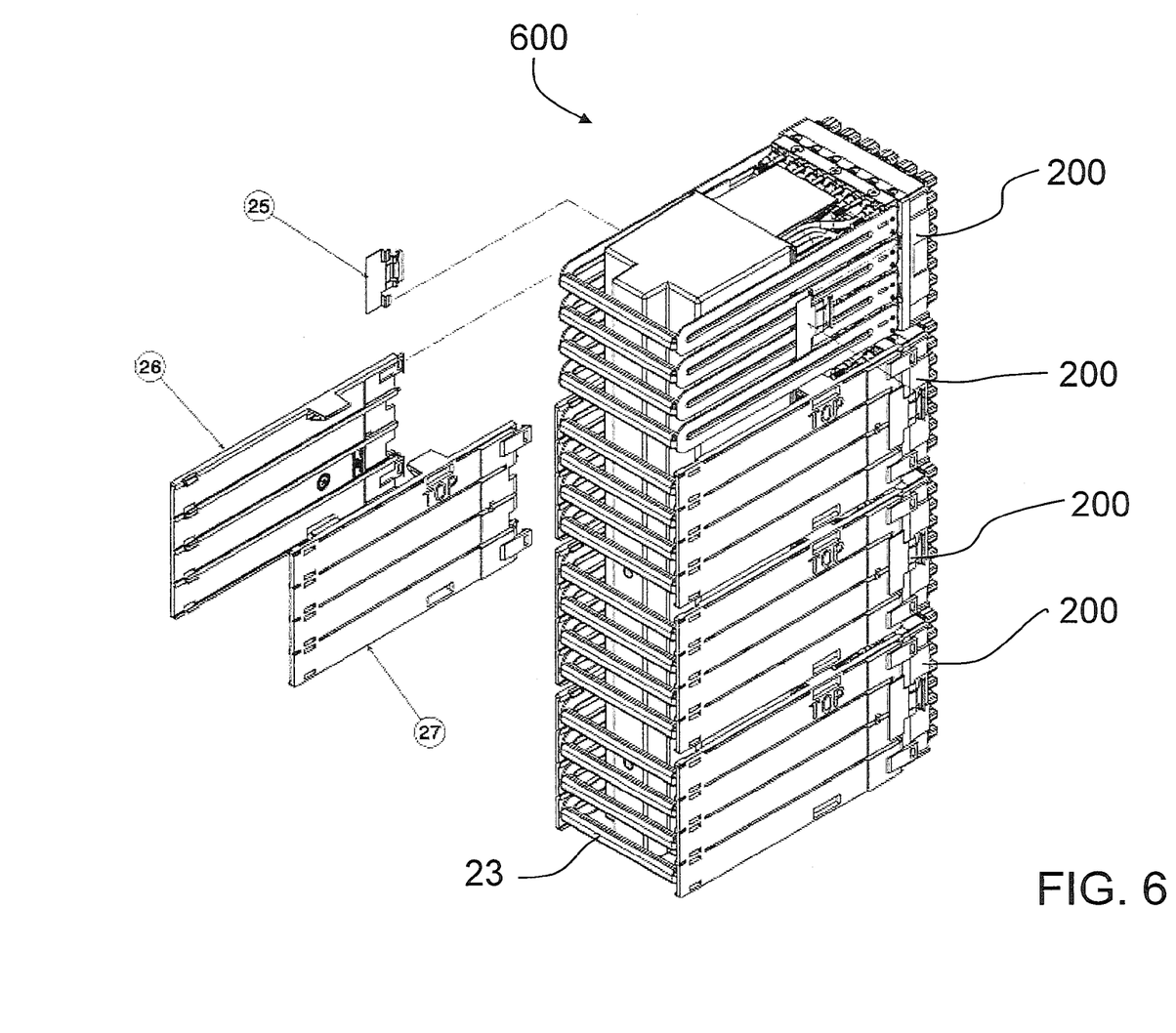
FIG. 6 depicts exemplary clips and panels in accordance with one or more embodiments.

FIG. 6 illustrates an assembly 600. The assembly 600 may serve as a part of an optical backplane in connection with a larger system or device. The assembly 600 may include one or more clips 25 which may be used to couple one or more blocks 200 to one or more nodes. Panels 26 and 27 may further provide a rigid structure to support, and prevent damage to, the assembly 600.

As described above, the assembly 600 may be associated with one or more systems or devices. For example, the assembly 600 may be implemented in connection with one or more computers, such as a Power7-775 server computer produced by International Business Machines Corporation (IBM).

Figure 7:
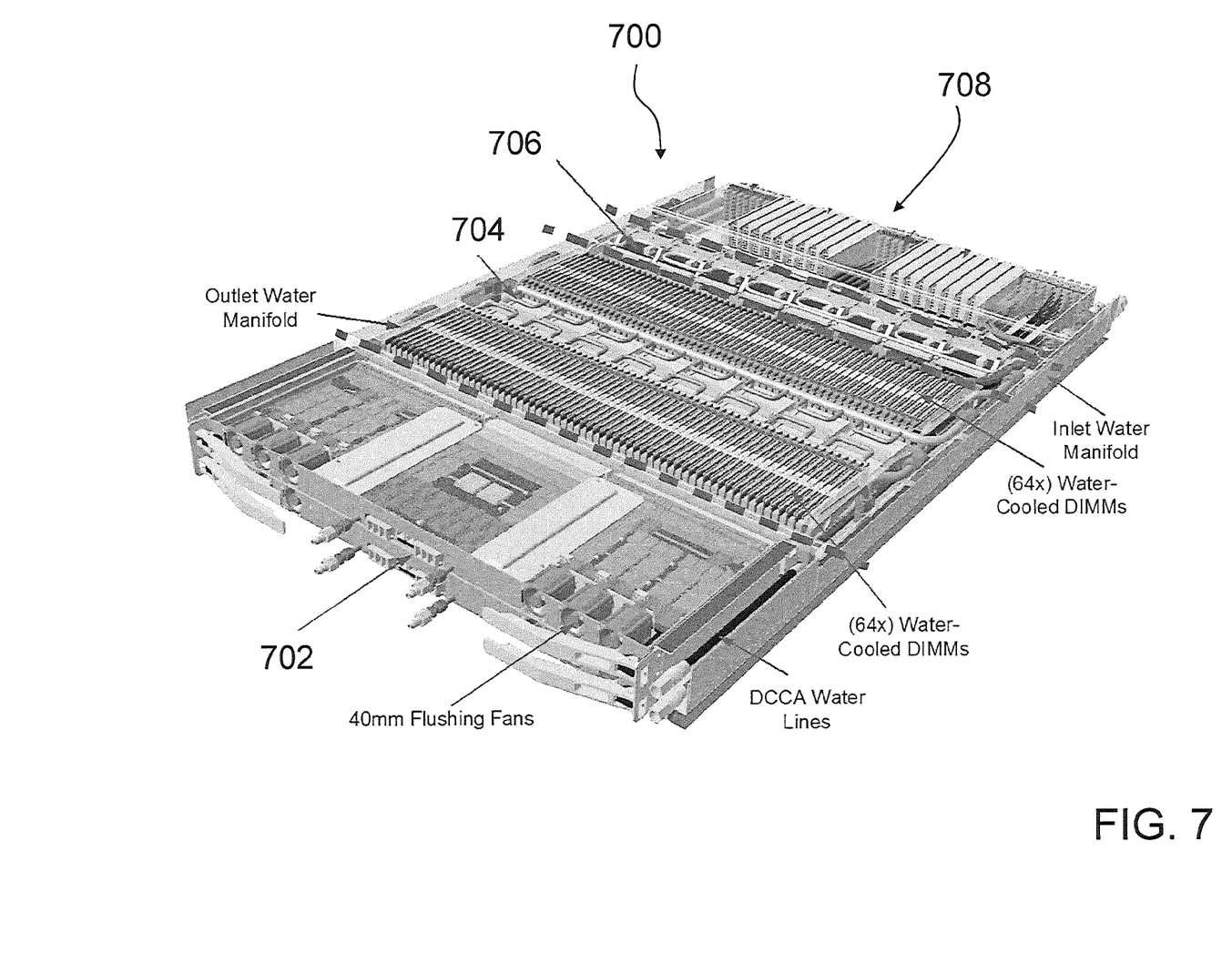
FIG. 7 depicts an exemplary drawer in accordance with one or more embodiments.

A server computer may be organized as one or more drawers. An example drawer 700 is shown in FIG. 7. The drawer 700 may be organized as one or more sections. A first section may correspond to a power supply area 702. The power supply area 702 may include two redundant supplies, referred to as "DCAs," which convert power from 350 VDC to lower controlled voltages. A second section may be referred to as a computing section 704, and may include a plurality of water-cooled Power7 Quad-Chip Modules surrounded by water-cooled DRAM memory DIMMs. A third section may correspond to a set of "hub" modules 706, which may provide a network interface and packet-routing switches for a network. The hub modules may include network interface and switching ASICs, with optical transmitters and receivers mounted on the modules. A fourth section 708, which may be located at one end of the drawer 700, may include one or more PCI-Express (PCIe) input/output (I/O) cards and optical connectors.

In some embodiments, one or more of the sections may include one or more cooling mechanisms. For example, a water cooling plate may be used to cool optic and/or a hub/switch ASIC.

Figure 8A:
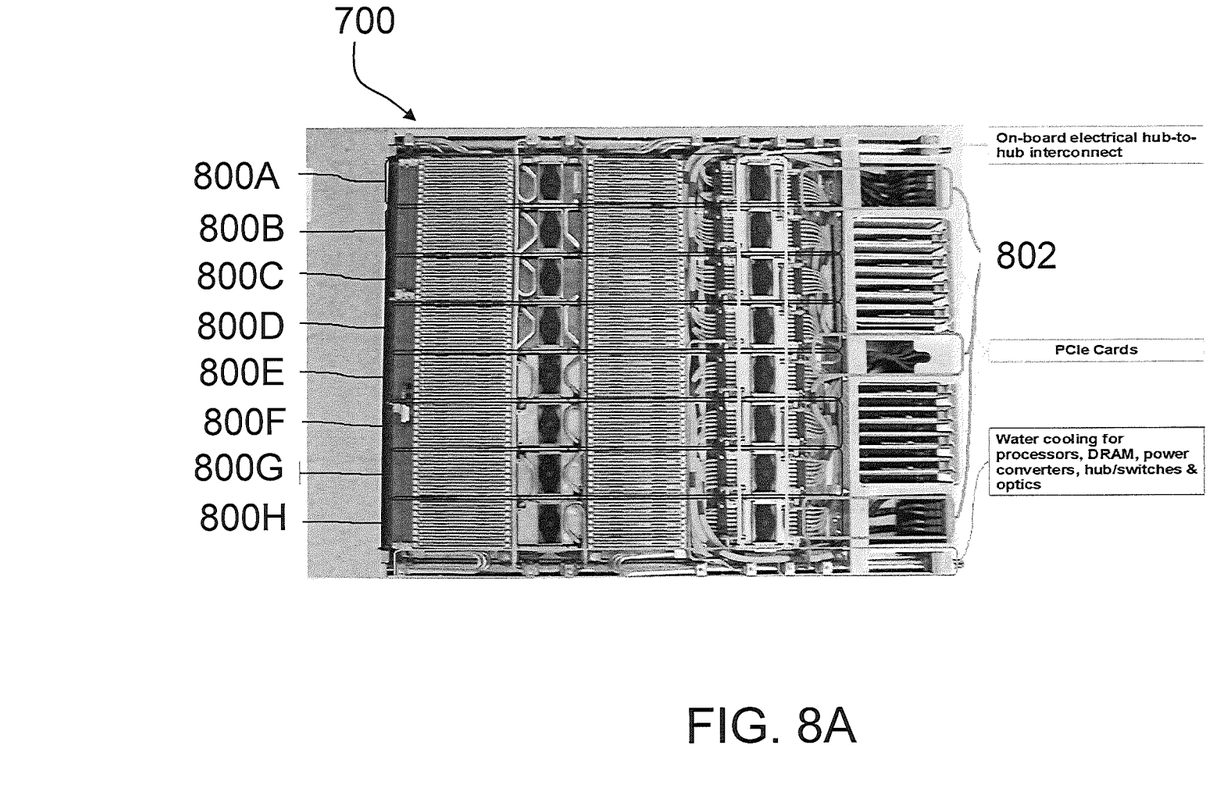
FIG. 8A depicts a top view and FIG. 8B depicts a rear view of an exemplary drawer in accordance with one or more embodiments.
Figure 8B:
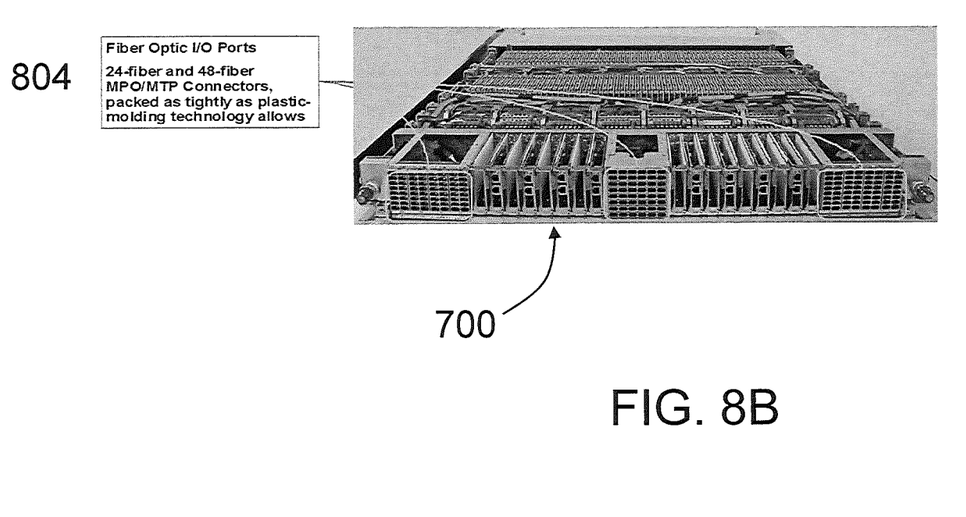

FIGS. 8A-8B show a top and rear view of the drawer 700. The drawer 700 may be organized into eight "octants," 800A-800H each of which may be a 32-way Symmetric-Multi-Processing (SMP) node, with processors (four chips on a quad-chip module), memory DIMMs, and a hub/switch module with optical transmitters and receivers mounted. A portion 802 may include optical fiber ribbon jumpers or cables, which may carry optical signals from the transmitters and receivers of the hub module to connectors 804, where the connectors 804 may provide for connection to drawer-to-drawer optical fiber cables.

The transmitters and receivers of the hub module may be referred to using one or more names, such as an opto-electronic device (OED). In some embodiments, an OED may either be a transmitter device or a receiver device. An OED may include a number of channels, such as twelve (12) channels. In some embodiments, a channel may support an incoming (e.g., receive) or outgoing (e.g., transmit) optical beam.

Figure 9:
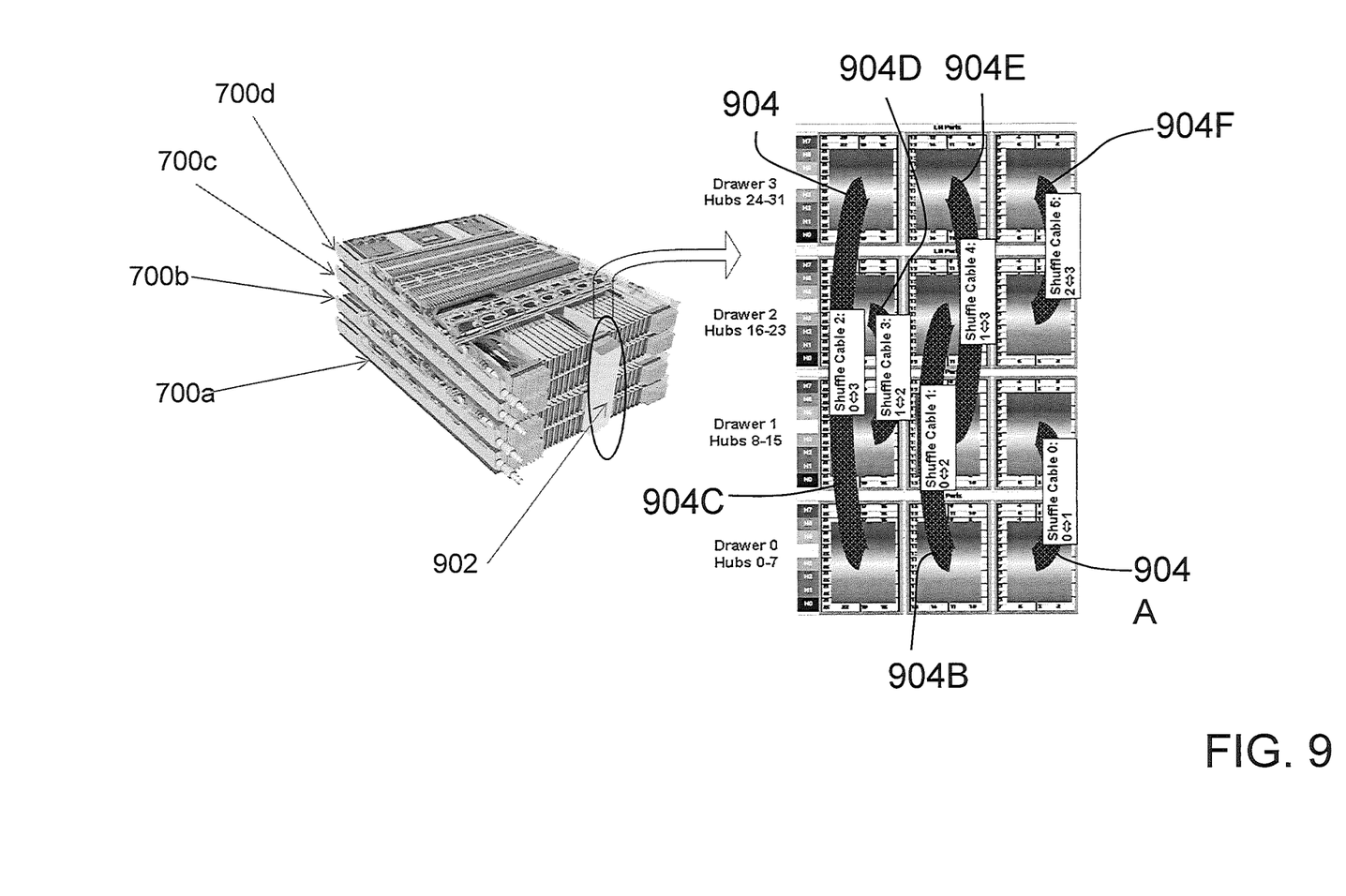
FIG. 9 depicts an exemplary mapping of shuffle cable assemblies and drawers in accordance with one or more embodiments.

FIG. 9 illustrates a collection or array of four drawers 700, denoted as drawers 700a through 700d. The drawers 700 may be connected together via an optical backplane, represented as a block 902 in FIG. 9. The optical backplane 902 may include, e.g., a total of three-hundred eighty-four (384) bidirectional optical links, where each link may include six (6) fiber channels or lanes in each of two directions (e.g., a first direction for reception and a second direction for transmission). The total number of fibers, each of which may be associated with a laser transmitter and/or a photodiode receiver, may therefore be equal to four-thousand six-hundred eight (4608), given by the expression: 384*(6+6)=4,608.

Also shown in FIG. 9 is a mapping of "shuffle cable" 904 units or assemblies to drawers 700. The shuffle cable assemblies 904 may be included in the optical backplane 902. The shuffle cable assemblies 904 may include a number (e.g., four) of shuffle cables, such as a shuffle cable 100. Each shuffle cable assembly 904 may be used to connect two distinct drawers 700 to each other. For example, a first shuffle cable assembly 904A may connect drawer 700a (or drawer 0) with drawer 700b (or drawer 1). A second shuffle cable assembly 904B may connect drawer 700a with drawer 700c (or drawer 2). A third shuffle cable assembly 904C may connect drawer 700a with drawer 700d (or drawer 3). A fourth shuffle cable assembly 904D may connect drawer 700b with drawer 700c. A fifth shuffle cable assembly 904E may connect drawer 700b with drawer 700d. A sixth shuffle cable assembly 904F may connect drawer 700c with drawer 700d. Each shuffle cable assembly 904 may include a number of optical fibers, such as seven-hundred sixty-eight (768) optical fibers.

Figure 10:
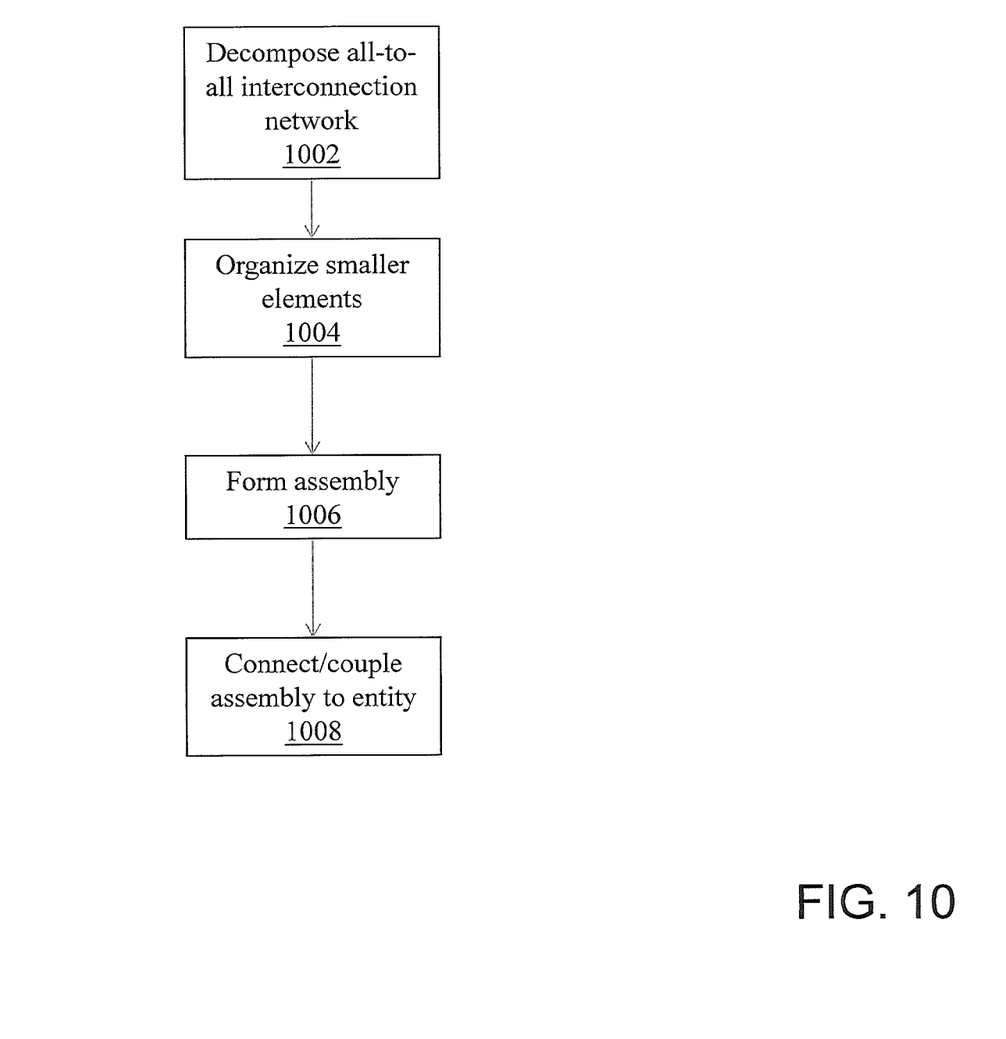
FIG. 10 depicts a flow chart of an exemplary method in accordance with one or more embodiments.

FIG. 10 illustrates an exemplary method in accordance with one or more embodiments of the disclosure. The method of FIG. 10 may be used to simplify the construction or manufacturing of an interconnection network, such as an all-to-all interconnection network.

In block 1002, an all-to-all interconnection network topology may be decomposed. For example, an all-to-all interconnection network topology may be generically decomposed into a multiplicity of smaller all-to-all interconnection network elements. The smaller elements may be replicated in a modular fashion to facilitate the construction of the full topology. For example, embodiments described herein include shuffle cables 100 that may each implement a 4×4 all-to-all topology, where a link may encompass twelve fibers or channels (e.g., six channels arranged to support transmission or a first direction and six channels arranged to support reception or a second direction). Illustrative embodiments may organize a server computer as one or more drawers connected together by one or more shuffle cable assemblies.

In block 1004, the smaller elements of block 1002 may be organized to form the full topology. For example, a determination may be made that the drawers will be connected to one another or coupled to one another via a backplane (e.g., an optical backplane). The backplane may include one or more shuffle cables or shuffle cable assemblies. As part of block 1004, sizes or dimensions may be selected for one or more components, such as one or more drawers, shuffle cables, shuffle cable assemblies, handles, connectors, etc. As part of block 1004, the components may be manufactured in accordance with the selected sizes/dimensions.

In block 1006, the smaller elements of block 1002 may be put together (or connected or wired together) to form an assembly in accordance with the organization of block 1004. The assembly may incorporate modular design principles to facilitate maintenance and construction of the assembly. One or more shells, casings, or enclosures may be included in the assembly to provide rigidity or mechanical support to the assembly. Such protection may be desirable in environments where the components (e.g., the cables or fibers) are susceptible to breakage.

In block 1008, the assembly may be connected to, or coupled to, an entity (e.g., a server computer).

The blocks or operations of the method of FIG. 10 are illustrative. In some embodiments, one or more operations (or portion(s) thereof) may be optional. In some embodiments, additional operations not shown may be included. In some embodiments, the operations may be executed in an order or sequence different from what is shown in FIG. 10.

The values shown and described herein in connection with the various embodiments are illustrative. In some embodiments, values or configurations different than those explicitly described herein may be used.

Technical effects and benefits of the disclosure include the provisioning of an interconnect structure. The interconnect structure may be used in networks featuring a large number of nodes. In some embodiments, a physical structure may be provided to connect to every other node in the network in a point-to-point fashion. Efficiency gains via the point-to-point connections may be realized. Such efficiency may be desirable in, e.g., parallel supercomputing applications or environments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for decomposing an all-to-all interconnection network topology into a plurality of smaller all-to-all interconnection network elements, comprising: a server computer comprising a plurality of drawers;
   a shuffle cable assembly comprising a plurality of shuffle cables, where each of the plurality of shuffle cables comprises a plurality of optical fibers and a plurality of connectors, wherein each of the plurality of shuffle cables implements a 4×4 all-to-all topology with a link width of at least one fiber per link direction and each drawer includes at least eight switching elements, and wherein each shuffle cable includes at least four connectors on each of two ends, and wherein each connector includes a standard MT or MPO Multi-fiber Push On/Pull Off optical connector;
   a block configured to organize, align, and maintain the plurality of connectors; and
   at least one handle coupled to the block and configured to actuate the plurality of connectors with respect to the plurality of drawers.

2. The system of claim 1, further comprising:
   a plurality of panels configured to provide a rigid structure to support and prevent damage to the shuffle cable assembly, the block, and the at least one handle.

3. The system of claim 1, wherein a mechanical tolerance associated with plugging the connectors into the plurality of drawers is equal to a first threshold that is less than a second threshold among the plurality of drawers.

4. A system for decomposing an all-to-all interconnection network topology into a plurality of smaller all-to-all interconnection network elements, comprising:
   a server computer comprising a plurality of drawers;
   a shuffle cable assembly comprising a plurality of shuffle cables, where each of the plurality of shuffle cables comprises a plurality of optical fibers and a plurality of connectors, wherein each drawer includes at least eight switching elements, and wherein each shuffle cable includes at least four connectors on each of two ends, and wherein each connector includes a standard MT or MPO Multi-fiber Push On/Pull Off optical connector, wherein each of the plurality of shuffle cables implements a 4×4 all-to-all topology with a link width of at least one fiber per link direction;
   a block configured to organize, align, and maintain the plurality of connectors; and
   at least one handle coupled to the block and configured to actuate the plurality of connectors with respect to the plurality of drawers, wherein a mechanical tolerance associated with plugging the connectors into the plurality of drawers is equal to a first threshold that is less than a second threshold among the plurality of drawers.

5. The system of claim 4, further comprising a plurality of panels configured to provide a rigid structure to support and prevent damage to the shuffle cable assembly, the block, and the at least one handle.

* * * * *